United States Patent Office 3,442,862
Patented May 6, 1969

3,442,862
METHOD FOR THE SOLID PHASE COPOLYMERIZATION OF TRIOXANE

Per Gustaf Magnus Flodin and Per Kornfeldt, Perstorp, Sweden, and Seizo Okamura and Toshinobu Higashimura, Sakyo-ku, Kyoto, Japan, assignors to Perstorp Aktiebolag (sometimes known as Perstorp AB), Perstorp, Sweden
No Drawing. Filed Feb. 14, 1964, Ser. No. 344,815
Claims priority, application Sweden, Feb. 22, 1963, 1,927/63
Int. Cl. C08g 1/04
U.S. Cl. 260—67                                      4 Claims High polymer products which can be used as plastic materials can be produced from trioxane. The available literature in this special field of the plastic technology is very extensive and also relates to many different production processes.

Homopolymers produced by polymerization of trioxane have caused difficulties when worked in common plastics processing machinery, principally owing to its insufficient stability at the temperatures required for said processing. The thermal stability of the homopolymers may, however, be improved in known manner by esterifying or etherifying the hydroxyl end groups of the polymers.

Another method to improve the thermal stability of the polymers is to introduce other atomic groups at recurring intervals into the polyoxymethylene chain. Thus, the tendency of splitting off formaldehyde from the ends of the polymer chain, by the so called unzippering effect is decreased. These atomic groups can be obtained in known manner by copolymerization of trioxane with a suitable comonomer.

Up until the present time the methods known for the production of trioxane copolymers consist of cationic polymerization in solution, in melt, or in gaseous phase.

The present invention relates to a method for the production of heat resistant copolymers from trioxane, and the invention is characterized in that trioxane in solid phase is copolymerized with one or more other cyclic monomers, the initiation being effected by cationic catalysts.

An intimate mixture of trioxane and comonomer is accomplished in one of the following ways:

(1) Predetermined amounts of comonomer are absorbed in trioxane crystals,
(2) Trioxane crystals are conditioned in an atmosphere of gaseous comonomer,
(3) Comonomer and trioxane are mixed in the molten state, and thereafter the mixture is allowed to crystallize so that a mixed solid phase is obtained,
(4) Trioxane crystals are suspended in an inert liquid which does not dissolve trioxane but contains the comonomer.

A cationic catalyst is added to the mixed solid starting material obtained according to any of the above-mentioned methods whereafter the copolymerization occurs.

The comonomers which can be used in connection with the present invention comprise cyclic monomers, such as epoxides, e.g., ethylene oxide, oxetanes, e.g., 2,2-bischloromethyloxacyclobutane, dioxanes, e.g., 1,3-m-dioxane, dioxolanes, e.g., 1,3-dioxolane, lactones, e.g., β-propiolactone etc.

The polymerization temperature may be varied, within wide limits, below the melting point. The temperature should be preferably over 30° C.

During polymerization, the particulate solid material is suitably surrounded by an inert gas or an inert liquid, and the pressure may be varied within wide limits.

Useful polymerization initiators are for instance, Lewis acids, e.g., $BF_3$ or complex compounds thereof, $SnCl_4$, etc. The polymerization process may be continuous or discontinuous.

One of the advantages obtained by using the present invention is the possibility of obtaining a copolymer with a very high degree of crystallinity. The polymers are obtained even though the starting material is not so pure with respect to chain transfer agents as compared with other polymerization methods where a higher degree of purity is required. Since polymers with a high molecular weight are easily obtained by a method according to the invention even in a polymerization system with a limited degree of purity, another special advantage beyond the previous mentioned is that the molecular weight can be easily adjusted by adding suitable amounts of chain transfer agents.

By the method according to the invention it is possible to obtain polymers in which substantially all molecules have a molecular weight which is equal to or near an optimum value. This means in other words, that the copolymer has a very narrow distribution of molecular weights in the range of the desired value.

The high degree of order in a crystal is one of the reasons why the copolymerization according to the invention gives a polymer with a higher degree of homogeneity, and a narrower molecular weight distribution, and a higher degree of crystallinity of the final polymer than known copolymers produced from trioxane in other states of aggregation: in gaseous phase, in melt, or in solution.

Finally, it should be pointed out that the method according to the invention gives an opportunity to simplify the production method and thus, to obtain a cheaper product. The use and recovery of solvents can be avoided as compared with polymerization in solution. When polymerized from molten state, a polymer block is usually obtained which must be comminuted before the further treatment. The copolymer produced according to the invention is obtained directly in the form of separate crystals of which the size can be adjusted in a manner suitable for further treatment.

The polymer is characterized by its thermal stability K and by the viscosity of the polymer solution. The thermal stability K is defined as the rate of thermal degradation of the polymer, the weight loss in percent per minute, at a predetermined temperature and in a chosen atmosphere. As a measure of the molecular weight serves the inherent viscosity $\eta$, which is measured at 60° C. on a 0.5 percent solution of the polymer in p-chlorophenol containing 2 percent α-pinene.

EXAMPLE 1

200 g. of technical grade trioxane was dissolved at 50° C. in 100 g. of dioxolane. During 6 hrs. the temperature was lowered to 15° C., whereby large crystals of trioxane containing dioxolane were obtained. The crystals were filtered from the mother liquor, dried in vacuum for 120 min., and thereafter dried in a desiccator over KOH for 22 hrs. The yield of crystals was 104 g. By gaschromatography, the content of dioxolane in the crystals was determined to be 2.6 percent.

60 g. of crystals produced as described was charged under nitrogen in a dry and pure 700 ml. glass flask. The flask was evacuated to 60 mm. Hg. whereafter 120 ml. gaseous $BF_3$ was added. The flask with its content was left at room temperature for 4 hrs., and thereafter the temperature was raised to 53° C. where it was maintained for 3 hrs. During this period, the crystal form of the material was maintained. Thereafter, air was introduced into the flask until the pressure had reached the atmospheric pressure, dimethylformamide containing 1 percent tri-n-butylamine was added, and the mixture was boiled under reflux for 30 min. and then it was cooled to room temperature. The polymer treated as stated was filtered off, washed twice in boiling water, and again washed twice in acetone, and dried for 4 hrs. at 70° C. The yield of polymer was 72 percent of charged crystals. The thermal stability $K_{222}$ measured in nitrogen was 0.25, and the inherent viscosity $\eta$ was 0.9.

EXAMPLE 2

5 ml. dioxolane was charged into a 700 ml. pure and dry wide necked flask filled with nitrogen. Above the dioxolane surface was placed a perforated porcelain disk on which 50 g. of crystalline trioxane was charged. The trioxane had previously been recrystallized from methylene chloride and dried over KOH in a vacuum desiccator. The flask was closed, heated to 53° C. where it was maintained for 2 hrs., and thereafter the temperature was decreased to room temperature. The flask was evacuated to 10 mm. Hg and 15 ml. of gaseous $BF_3$ was introduced. After 1 hr. at room temperature and 3 hrs., at 55° C., the polymer was washed and dried as described in Example 1. The yield of polymer was 63 percent. The thermal stability $K_{222}$ in nitrogen was 0.41, and the inherent viscosity $\eta$ was 1.1.

EXAMPLE 3

In a clean and dry 700 ml. wide necked flask filled with nitrogen, 2 g. epichlorohydrin was introduced and above the surface thereof, on a porcelain disk 60 g. of pure crystalline, trioxane was charged. The flask was then treated as described in Example 2, and the polymer obtained was washed and dried as described in Example 1. The yield of polymer was 67 percent of the charged trioxane. The thermal stability $K_{222}$ in nitrogen was 2.0 and the inherent viscosity $\eta$ was 0.64.

EXAMPLE 4

In a clean and dry 700 ml. wide necked flask was introduced 2 g. of β-propiolactone and above the surface thereof, 60 g. of pure crystalline trioxane was charged on a porcelain disk. The flask was treated as described in Example 2. The polymer obtained was washed and dried as described in Example 1. The yield of polymer was 67 percent. The thermal stability $K_{222}$ in nitrogen was 1.7 and the inherent viscosity $\eta$ 0.73.

EXAMPLE 5

In a clean and dry 700 ml. wide necked flask filled with nitrogen, 60 g. of pure crystalline, trioxane was charged. The flask was evacuated to 10 mm. Hg. and 350 ml. ethylene oxide gas was introduced into the flask. After 1 hr. at room temperature, 15 ml. gaseous $BF_3$ was introduced. After 1 hr. the temperature was raised to 53° C. and maintained for 3 hrs. The polymer was washed and dried as described in Example 1. The yield of polymer was 60 percent. The thermal stability $K_{222}$ in nitrogen was 0.92 and the inherent viscosity $\eta$ 0.82.

EXAMPLE 6

120 g. of n-hexane with a water content less than 10 p.p.m. was charged in a clean and dry 700 ml. wide necked flask filled with nitrogen. To this inert liquid was added 60 g. pure trioxane crystals and 2 ml. dioxolane. 15 ml. gaseous $BF_3$ was introduced into the flask which was then left at room temperature for 1 hr. Thereafter, the flask was evacuated to 350 mm. Hg. and was heated to 53° C. and kept at this temperature for 3 hrs. The polymer obtained was filtered, washed, and dried as described in Example 1. The yield of polymer was 81 percent. The heat stability $K_{222}$ in nitrogen was 0.6 and the inherent viscosity $\eta$ was 0.61.

EXAMPLE 7

120 g. of n-hexane with a water content less than 10 p.p.m. was charged in a clean and dry 700 ml. wide necked flask filled with nitrogen. To this inert liquid was added 60 g. pure trioxane crystals and 2 g. epichlorohydrin. 15 ml. gaseous $BF_3$ was introduced into the flask which was then left at room temperature for 1 hr. Thereafter, the flask was evacuated to 350 mm. Hg. and was heated to 53° C. and kept at this temperature for 3 hrs. The polymer obtained was filtered, washed, and dried as described in Example 1. The yield of polymer was 75 percent. The heat stability $K_{222}$ in nitrogen was 2.7. and the inherent viscosity $\eta$ was 0.9.

EXAMPLE 8

In a clean and dry 700 ml. wide necked flask filled with nitrogen and provided with a stirrer was charged 60 g. of dry trioxane crystals and 3 g. of dioxolane. The dioxolane contained water to an amount equivalent to the quantity of initiator (gaseous $BF_3$) provided for the polymerization. The flask was evacuated to 10 mm. Hg, and 12.5 ml. gaseous $BF_3$ was introduced from a gas pipette which then was rinsed with nitrogen until the pressure in the flask was 400 mm. Hg. After 5 min. the flask was placed in water having a temperature of 53° C.±0.2° C. After 3 min., polymerization could be observed. The polymerization was continued for 1 hr. and interrupted by sucking 300 ml. dimethylformamide containing 0.5 percent tri-n-butylamine and 1 percent diphenylamine into the flask. The polymer obtained was swelled by boiling under reflux for 1 hr. in the dimethylformamide, the latter being filtered off after cooling to room temperature. The polymer was washed by vigorous stirring in acetone twice, in boiling water twice, and finally, once in methylene chloride. Then it was dried for 4 hrs. at 70° C. in a circulatory oven. The yield of polymer was 67 percent. The thermal stability of the copolymer $K_{222}$ in nitrogen was 2.6, and the inherent viscosity was 1.16 and the content of —$C_2H_4O$— groups (from the comonomer) was 2.3 percent.

EXAMPLE 9

In a dry and clean 700 ml. wide necked flask filled with nitrogen and equipped with a stirrer was charged 60 g. of dry trioxane crystals and 4.5 g. of dioxolane. The dioxolane contained water in an amount equivalent to the amount of initiator. The polymerization and the washing of the polymer was carried out in the same manner as described in Example 8. The yield was 88 percent. The thermal stability $K_{222}$ in nitrogen was 0.24, the inherent viscosity $\eta$ was 0.82, and the content of —$C_2H_4O$— groups 3.04 percent.

We claim:
1. A process for the preparation of heat resistant copolymers of trioxane which comprises subjecting trioxane crystals to a temperature greater than 30° C. and not exceeding the melting point of said crystals in an atmosphere containing vapors of a cyclic comonomer and a cationic polymerization catalyst, and recovering a copolymer of trioxane and said comonomer.
2. The process of claim 1 in which the cyclic comonomer is selected from the group consisting of ethylene oxide, epichlorohydrin, 2,2 - bischloromethyloxacyclobutane, 1,3-m-dioxane, 1,3-dioxolane, and β-propiolactone.
3. The process of claim 1 in which the comonomer is ethylene oxide.
4. A process for the preparation of heat-resistant copolymers of trioxane which comprises preparing an intimate mixture of solid trioxane and at least one comonomer from the group consisting of ethylene oxide, epichlorohydrin, 2,2-bischloromethyloxacyclobutane, 1,3-m-dioxane, 1,3-dioxolane, and β-propiolactone, subjecting the resultant solid to a temperature not exceeding the melting point of that solid in the presence of a cationic polymerization catalyst, said process being conducted in a system in which trioxane crystals are surrounded by vapors of the comonomer.

(References on following page)

References Cited

UNITED STATES PATENTS

| | | | |
|---|---|---|---|
| 3,156,671 | 11/1964 | Suter et al. | 260—67 |
| 3,297,645 | 1/1967 | Miller | 260—67 |

OTHER REFERENCES

Kern et al.: Angewandte Chemie, 73(6), pp. 177–186. (March 1961), pp. 181–183 relied on.

Okamura et al.: Journ. Chem. Soc. Japan, Ind Chem. Soc., 65, No. 5, pp. 712–716 (1962).

Hoshino et al.: Annual Report of the Japanese Association for Radiation Research on Polymers, vol. 1, (1960), pp. 525–527.

Okamura et al.: Die Makromolekulare Chemie, 51 (1962) pp. 217–219.

Okamura et al.: Journal of Polymer Science, 58(166) Pt. 2 (1962), pp. 925–953.

WILLIAM H. SHORT, *Primary Examiner.*

L. M. PHYNES, *Assistant Examiner.*